July 29, 1941.  H. P. SCHNEIDER  2,250,655
CLICKING MACHINE
Filed Sept. 18, 1940  3 Sheets-Sheet 1

INVENTOR
HANS PETER SCHNEIDER
BY
James & Franklin
ATTORNEYS

July 29, 1941.  H. P. SCHNEIDER  2,250,655
CLICKING MACHINE
Filed Sept. 18, 1940  3 Sheets-Sheet 2
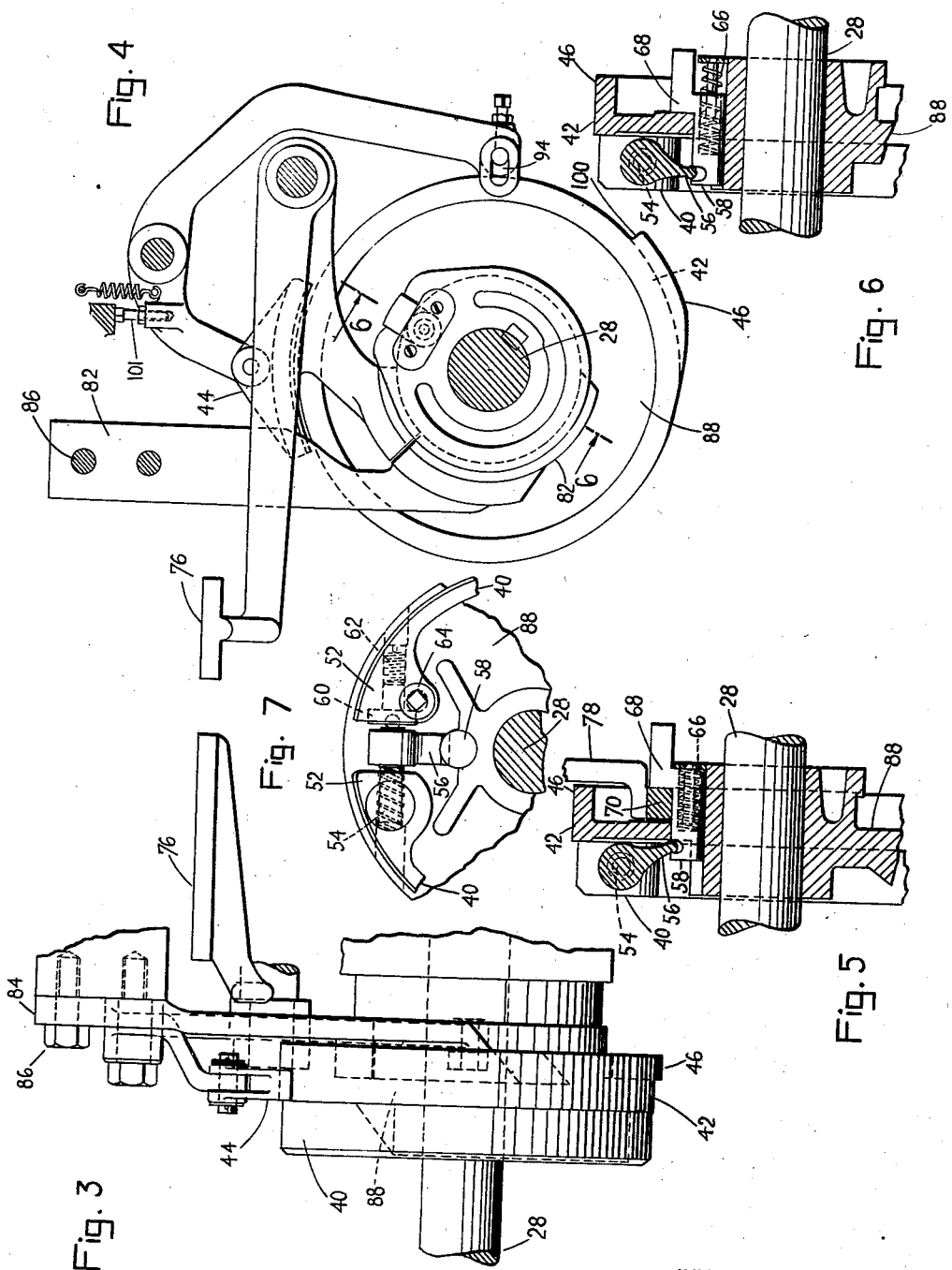
INVENTOR
HANS PETER SCHNEIDER
BY
James + Franklin
ATTORNEYS

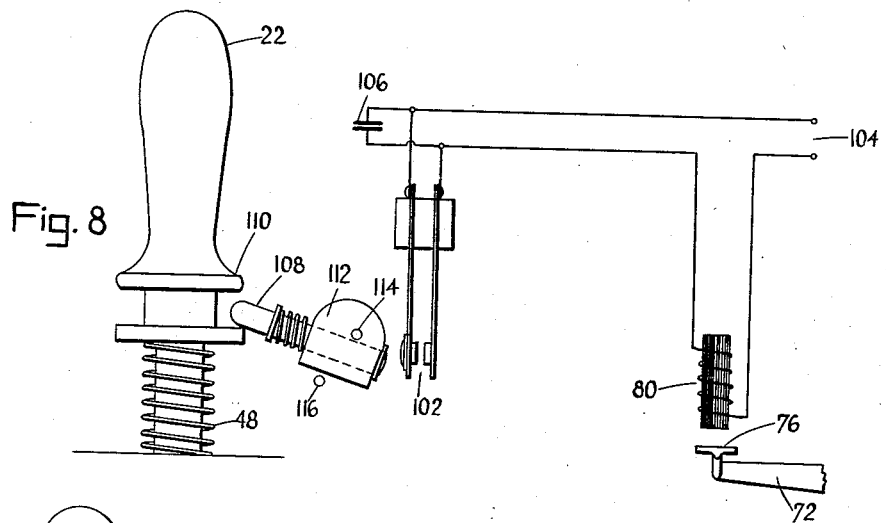
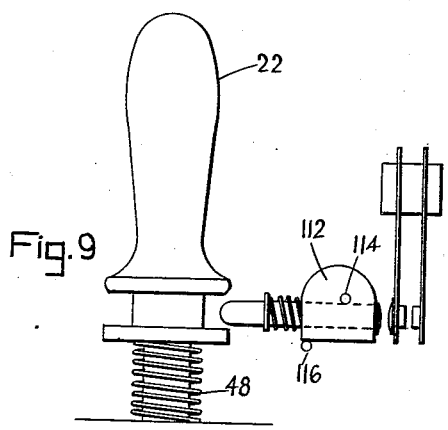
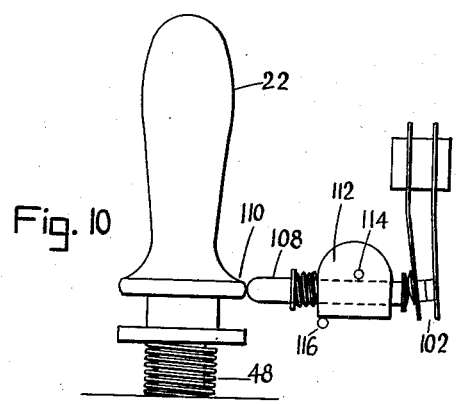
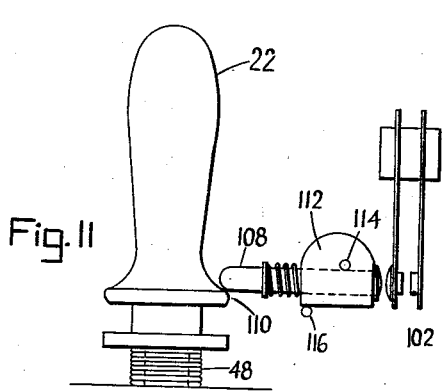
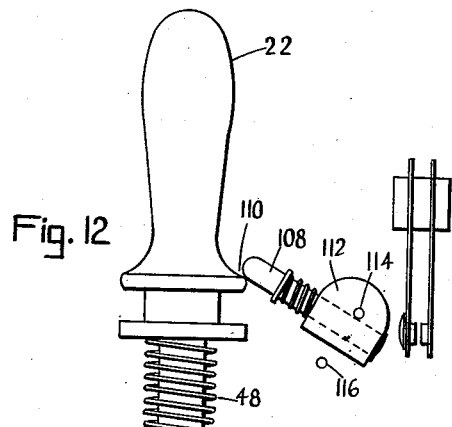
INVENTOR
HANS PETER SCHNEIDER
BY
ATTORNEYS Patented July 29, 1941

2,250,655

UNITED STATES PATENT OFFICE 2,250,655

CLICKING MACHINE

Hans Peter Schneider, Ridgewood, N. Y., assignor to Herman Schwabe, Inc., New York, N. Y., a corporation of New York Application September 18, 1940, Serial No. 357,234

10 Claims. (Cl. 164—23)

This invention relates to clicking machines, and more particularly to control mechanism for starting and stopping the same.

The primary object of my invention is to generally improve clicking machines. A more particular object is to improve the control mechanism for starting and stopping the same.

In conventional clicking machines the drive shaft is provided with a single revolution clutch which is automatically disengaged substantially at the end of a full revolution. To stop the machine at top dead center the drive shaft is provided with a brake drum and an extensive brake band capable of stopping the machine very quickly. When the clutch is again engaged to start the machine the brake is still on, thereby greatly increasing the starting load of the machine. To overcome this difficulty, it has been proposed to provide means for releasing the brake just before starting the machine, but the mechanisms for this purpose are complex and troublesome.

One specific object of the present invention is to overcome the foregoing difficulties. This is done by providing means to automatically disengage the clutch almost immediately after completion of the cutting operation, that is, after a half revolution of the drive shaft. This allows nearly a half revolution to bring the shaft to rest, which consequently may be done with much less braking effort. Moreover, the brake may be controlled and operated by a cam mounted on the drive shaft. This provides accurate localized control of the brake with easily accessible adjustments for the same. The brake is on when the machine starts, but this is of no great consequence when, as in the present case, the braking force is greatly reduced because of the early disengagement of the clutch. Moreover, the cam may be so shaped as to provide an abrupt and positive release of the braking force almost immediately after starting of the machine. This is to be contrasted with the conventional arrangement in which the brake is controlled by its connection to the presser or the pitman moving the same.

A further object is to simplify the mechanism for engaging the clutch. For this purpose I provide electromagnetic means, thereby eliminating the need for mechanical linkage between the control handle and the clutch. The circuit of the electromagnetic means at the clutch is controlled by a switch at the handle of the clicking machine, and this switch is preferably so arranged that the switch is closed only momentarily during downward movement of the handle, and is not closed at all during upward movement of the handle.

To the accomplishment of the foregoing and such other objects as will hereinafter appear, my invention consists in the clicking machine elements and their relation one to the other as hereinafter are more particularly described in the specification and sought to be defined in the claims. The specification is accompanied by drawings, in which:

Fig. 3 is a side elevation of the mechanism shown in Fig. 2;

Fig. 4 is a section similar to Fig. 2, but showing the relation of the parts during operation of the machine;

Fig. 5 is a section taken in the plane of the line 5—5 of Fig. 2;

Fig. 6 is a section taken approximately in the plane of the line 6—6 of Fig. 4;

Fig. 7 is explanatory of the clutch mechanism;

Fig. 8 is a schematic diagram explanatory of the control handle and associated switch, with the handle in elevated position;

Fig. 9 illustrates the relation of the parts as the handle is partially depressed;

Fig. 10 shows the relation of the parts with the handle in a somewhat lower position;

Fig. 11 shows the relation of the parts with the handle all the way down; and

Fig. 12 illustrates the relation of the parts as the handle is raised.

Figure 1:
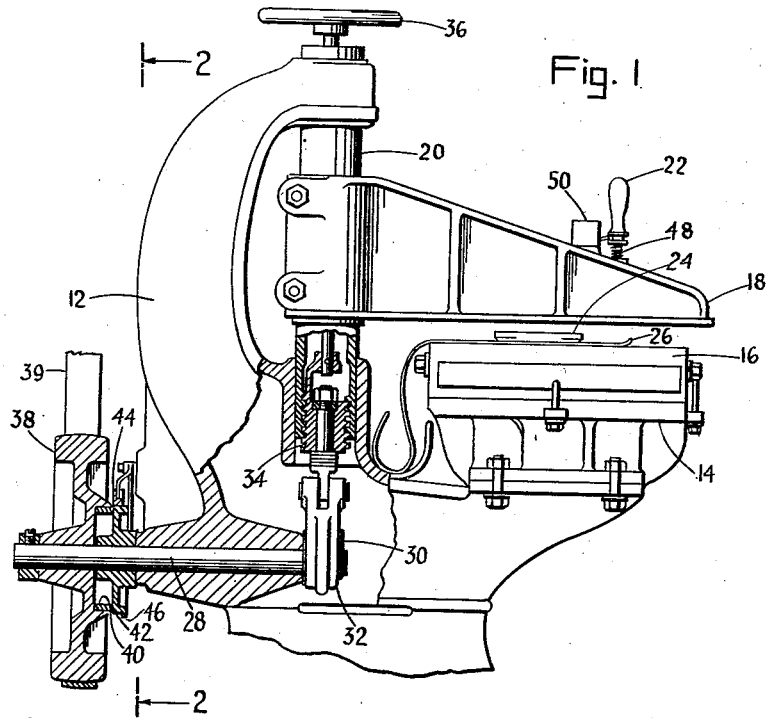
Fig. 1 is a partially sectioned side elevation of a clicking machine embodying features of my invention.

Referring to the drawings, and more particularly to Fig. 1, the clicking machine there shown comprises a frame 12 having a table 14 on which is mounted a wooden block 16. The head or presser 18 is carried on a post 20 which is vertically reciprocable in frame 12. It is also rotatable in the frame so that the presser 18 may be swung out of the way by means of handle 22 between cutting operations, thus permitting the operator to move the die 24 to an adjacent position on the sheet 26 of leather which is being cut.

The machine is provided with a drive shaft 28 carrying an eccentric 30 within an eccentric rod or pitman 32, which in turn is connected to the post 20, preferably through screw adjusting means 34 controlled by a handle 36, for determining the elevation of the presser 18 relative to the blocks 16. The shaft 28 is driven by a combined pulley and fly wheel 38 which rotates loosely on shaft 28 but which may be locked to the shaft by means of an internal expanding clutch indicated at 40, said clutch being released in less than a single revolution. It will be understood that the pulley 38 is constantly driven through a belt 39 by an electric motor or other suitable source of power, not shown in the drawings.

The drive shaft 28 is also provided with a brake drum 42 operated on by a brake shoe 44, which in turn is controlled by a cam 46. The clutch 40 is engaged and the machine started by depression of the handle 22 against the resistance of a spring 48, said handle controlling a switch housed at 50. This switch controls the circuit of electromagnetic means mounted at the back of the machine near the clutch.

Considering the arrangement in greater detail, and referring now to Fig. 7, the internal structure of the clutch is conventional in comprising a split ring 40, the adjacent ends 52 of which may be pushed apart by means of a threaded thrust pin 54 oscillated by an arm 56, the lower end of which is received in an axially reciprocable plunger 58. The opposite end of thrust pin 54 is ball-shaped and bears against a thrust block 60, the position of which may be adjusted by means of a screw 62 and locked by a lock screw 64. It may be mentioned that in Fig. 7, and Figs. 2 through 6 as well, the pulley 38 and consequently the driving portion of the clutch immediately surrounding the split ring 40, have been omitted.

Referring now to Figs. 5 and 6, the arm 56 of thrust pin 54 is received in a transverse slot in plunger 58. Plunger 58 is normally urged inwardly or toward the left in Figs. 5 and 6 by means of a compression spring 66. This moves the clutch into engaged position as shown in Fig. 6. The plunger 58 is provided with a step or shoulder 68 which may be forced outwardly or toward the right by means of a suitable block 70, as is shown in Fig. 5.

Figure 2:
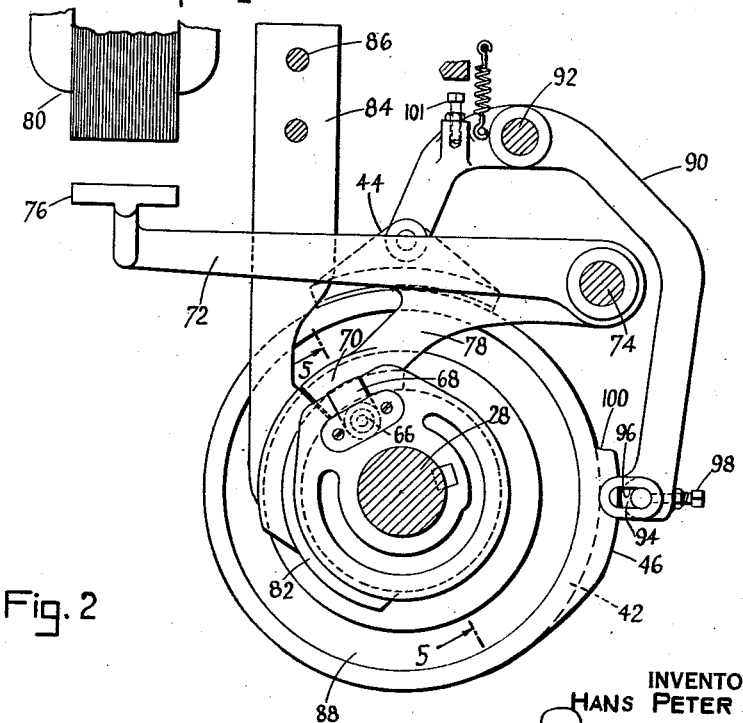
Fig. 2 is a transverse section drawn to enlarged scale looking approximately in the plane of the line 2—2 of Fig. 1.

Referring now to Fig. 2, the parts are shown in their position of rest or top dead center for the eccentric 30 (Fig. 1). The shoulder 68 of plunger 66 is held in outward position by means of block 70. This may be elevated by means of a clutch arm 72 pivoted at 74 and provided with an armature 76. In the present case the block 70 is formed integrally with the clutch arm 72, the parts being connected at 78. By consideration of Figs. 2 and 5, it will be evident that elevation of clutch arm 72, as by energization of electromagnet 80, will raise block 70 above shoulder 68, thus permitting inward movement of the plunger and consequent engagement of the clutch, whereupon the drive shaft 28 will rotate with the constantly rotating pulley 38.

The cutting operation is completed in a half revolution of drive shaft, following which the presser is raised to elevated position. In conventional machines the clutch is a single revolution clutch which is automatically released near the end of a full revolution. In the present machine I provide a wedge 82, the point of which is only slightly removed from the bottom position or half-revolution position. The wedge 82 is fixedly carried at the lower end of an arm 84, which in turn is secured to the frame of the machine as by means of bolts 86. Thus the clutch is disengaged far earlier than is usual in this class of machine.

The split ring 40 is mounted on and rotates with a disc 88 which forms a part of brake drum 42. Moreover, the brake operating cam 46 is formed integrally with the brake drum as will be evident from inspection of Figs. 2 through 6. The brake shoe 44 is carried at one end of a brake arm 90 pivoted on the machine frame at 92. The lower end of arm 90 acts as a cam follower and carries a roller 94, the position of which is adjustable in spaced mating slots 96 by means of adjusting screws 98. This in turn acts as an adjustment of the braking force exerted by the cam 46 as will be clear from inspection of Fig. 2. The duration of brake application is determined by the length of the rise of cam 46, and this may be made comparatively short as is shown in the drawings. Moreover, the degree of braking effort is comparatively small because of the early disengagement of the clutch. At the moment of starting the brake is on, but shortly thereafter the abrupt drop of cam 46, indicated at 100, provides a complete release of the brake, this remaining released during most of the operation as will be seen by contrasting Fig. 4 with Fig. 2. If desired, an adjustable stop 101 may be provided to limit the brake release, thus reducing wear on roller 94.

When the clutch is disengaged during the second half revolution of the drive shaft, the plunger 58 is forced outwardly by the wedge 82. It is held outwardly by block 70 which is located immediately behind the wedge and acts as a continuation of the same. Thus the block 70 and clutch arm 72 must be lowered immediately after being raised in order to prevent any possibility of more than one rotation of the drive shaft. The operating speed of these machines is so high that it is not practical nor desirable to release the control handle 22 during the single rotation of the drive shaft. Accordingly the electromagnet 80 should be energized only momentarily and should not be energized by the return movement or rise of control handle 22. A switch mechanism which fulfills these requirements is schematically illustrated in Figs. 8 through 12 of the drawings. Handle 22 is vertically slidable and is normally elevated by compression spring 48. Switch 102 is normally open and is arranged in series with magnet 80, and a suitable source of power connected at 104. A condenser 106 is preferably connected across switch 102 to prevent arcing at the contacts. A plunger 108 is located between handle 22 and the switch 102. The handle is provided with a camming surface 110 for causing sliding movement of the plunger 108 against the switch, thus closing the switch as shown in Fig. 10. On continued downward movement of handle 22, the switch is again opened as will be seen in Fig. 11.

To prevent closing of the switch during upward movement of the handle the plunger 108 is mounted in a bearing 112 which is itself pivoted at 114. Downward movement of bearing 112 is limited by means of a fixed stop 116. Thus as handle 22 is pushed downwardly from the position shown in Fig. 8 to that shown in Fig. 9, the plunger 108 and bearing 112 move downwardly about pivot 114 until bearing 112 reaches stop 116. Continued downward movement of handle 22 forces plunger 108 toward the right, thus closing the switch 102 as shown in Fig. 10. As the handle is moved downward to lowermost position the switch is again opened as shown in Fig.

11. Now when the handle is released for upward movement the plunger 108 and bearing 112 simply turn upwardly about pivot 114 as is shown in Fig. 12. In Fig. 12 the handle has moved upwardly only part of its distance. As its upward movement is completed the plunger 108 moves below cam 110 as shown in Fig. 8.

With this arrangement the magnet is only momentarily energized as the control handle is pushed down to bottom position, thus preventing more than a single revolution of the drive shaft. To again operate the machine it is necessary to release and again depress the control handle 22.

It is believed that the construction and operation of my improved clicking machine and control mechanism therefore, as well as the advantages thereof, will be apparent from the foregoing detailed description. It will also be apparent that while I have shown and described my invention in a preferred form, many changes and modifications may be made in the structure disclosed without departing from the spirit of the invention as sought to be defined in the following claims.

I claim:

1. A clicking machine comprising a presser, a drive shaft for operating said presser, a loose driving wheel, a less than one revolution clutch between said wheel and said shaft, a brake drum on said shaft, a brake for said drum, a cam on said shaft, and cam follower means operating on said brake, whereby said brake is applied near the end of a single revolution under control of the cam.

2. A clicking machine comprising a presser, a drive shaft for operating said presser, a loose driving pulley, a less than one revolution clutch between said pulley and said shaft, a brake drum on said shaft, a brake shoe cooperating with said drum, a brake arm carrying said shoe, a cam on said shaft, and cam follower means operating upon said brake arm, whereby said brake is applied near the end of a single revolution under control of the cam.

3. A clicking machine comprising a presser, a drive shaft for operating the presser, a loose driving wheel, a clutch for locking said wheel to said shaft, manually controllable means for engaging said clutch, means for automatically disengaging said clutch, said means being so positioned as to disengage the clutch after only approximately half a revolution of the drive shaft, allowing nearly half a revolution to bring the drive shaft to rest, a brake drum on said shaft, a brake for said drum, a cam on said shaft, and cam follower means operating on said brake, whereby said brake is applied near the end of a single revolution under control of the cam.

4. A clicking machine comprising a presser, a drive shaft for operating the presser, a loose driving pulley, a clutch for locking said pulley to said shaft, manually controllable means for engaging said clutch, a wedge for automatically disengaging said clutch, said wedge being so positioned as to disengage the clutch immediately after a half revolution of the drive shaft, whereby the clutch is disengaged promptly after completion of the cutting operation, thus allowing nearly half a revolution to bring the drive shaft to rest, a brake drum on said shaft, a brake shoe cooperating with said drum, a brake arm carrying said shoe, a cam on said shaft, and cam follower means operating upon said brake arm, whereby said brake is applied near the end of a single revolution under control of the cam.

5. A clicking machine comprising a presser, a drive shaft for operating said presser, a loose driving wheel, a less than one revolution clutch between said wheel and said shaft, a clutch-engaging arm associated with said clutch, electro-magnetic means for operating said arm, and control means for said clicking machine including a vertically reciprocable handle on said presser for swinging said presser, an electric switch associated with said handle for energizing said electro-magnetic means, and means between said handle and said switch so arranged that the switch is closed only momentarily during downward movement of the handle, and is not closed during upward movement of the handle.

6. A clicking machine comprising a presser, a drive shaft for operating said presser, a loose driving pulley, a single-revolution clutch between said pulley and said shaft, clutch-engaging means associated with said clutch, electromagnetic means for operating said arm, and control means for said clicking machine including a vertically reciprocable handle on said presser for swinging said presser, an electric switch associated with said handle for energizing said electro-magnetic means, and means between said handle and said switch so arranged that the switch is closed only momentarily during downward movement of the handle, and is not closed during upward movement of the handle, said means including a plunger, means on said handle for causing sliding movement of said plunger against said switch during downward movement of the handle, and means whereby said plunger is tilted upwardly during upward movement of the handle.

7. A clicking machine comprising a presser, a drive shaft for operating said presser, a loose driving pulley, a less than one revolution clutch between said pulley and said shaft, a clutch-engaging arm associated with said clutch, electromagnetic means for operating said arm, and control means for said clicking machine including a vertically reciprocable handle on said presser for swinging said presser, an electric switch associated with said handle for energizing said electro-magnetic means, and means between said handle and said switch so arranged that the switch is closed only momentarily during downward movement of the handle, and is not closed during upward movement of the handle, said means including a generally horizontally movable plunger, a bearing carrying said plunger, said bearing being pivoted about a horizontal axis transverse of the plunger, a stop for limiting downward movement of said bearing, means on said handle for exerting a camming action causing sliding movement of said plunger against said switch during downward movement of the handle, said plunger and bearing being tilted upwardly during upward movement of the handle.

8. A high speed clicking machine comprising a presser, a single-revolution drive shaft for operating the presser, a loose driving wheel and means to rotate the same continuously at high speed, a clutch between said wheel and said shaft, manually controllable means for engaging said clutch, means for automatically disengaging said clutch independently of and before said manually controlled means is released, said means being so positioned as to disengage the clutch after only approximately half a revolution of the drive shaft, allowing nearly half a revolution to bring the drive shaft to rest, a brake for stopping the drive shaft, and means independent of said manually controlled means to apply the brake after the clutch has ben disengaged and before the shaft has turned a full revolution.

9. A high speed clicking machine comprising a presser, a single-revolution drive shaft for operating the presser, a loose driving pulley and means to rotate the same continuously at high speed, a clutch between said pulley and said shaft, manually controllable means for engaging said clutch, the speed of said driving pulley being too great for timely release of said means, a wedge for automatically disengaging said clutch independently of and before said manually controlled means is released, said wedge being so positioned as to disengage the clutch immediately after a half revolution of the drive shaft, whereby the clutch is disengaged promptly after completion of the cutting operation, thus allowing nearly half a revolution to bring the drive shaft to rest, a brake for stopping the drive shaft, and means independent of said manually controlled means to apply the brake after the clutch has been disengaged and before the shaft has turned a full revolution.

10. A high speed clicking machine comprising a presser, a single upright post carrying the presser reciprocably and oscillatably, a single-revolution drive shaft for operating the presser, a loose driving wheel and means to rotate the same continuously at high speed, a clutch between said wheel and said shaft, a manually controllable handle on said presser for swinging the presser, said handle being vertically movable for engaging said clutch, the speed of said driving wheel being too great for timely release of said means, means for automatically disengaging said clutch independently of and before said handle is released, said means being so positioned as to disengage the clutch after only approximately half a revolution of the drive shaft, allowing nearly half a revolution to bring the drive shaft to rest, a brake for stopping said drive shaft, and means independent of said manually controlled means to automatically apply the brake after the clutch has been disengaged and before the shaft has turned a full revolution.

HANS PETER SCHNEIDER.